United States Patent
Cortez (10) Patent No.: US 7,865,730 B2
(45) Date of Patent: Jan. 4, 2011

(54) BCENCRYPTION (BCE)—A PUBLIC-KEY BASED METHOD TO ENCRYPT A DATA STREAM

(75) Inventor: Brian Keith Cortez, Tewksbury, MA (US)

(73) Assignee: Kronos Technology Systems Limited Partnership, Chelmsford, MA (US)

(*) Notice: Subject to any disclaimer, the term of this patent is extended or adjusted under 35 U.S.C. 154(b) by 967 days.

(21) Appl. No.: 11/698,260

(22) Filed: Jan. 25, 2007

(65) Prior Publication Data

US 2007/0180230 A1      Aug. 2, 2007

Related U.S. Application Data

(60) Provisional application No. 60/763,332, filed on Jan. 30, 2006.

(51) Int. Cl.
*H04L 9/00* (2006.01)
*H04L 9/16* (2006.01)

(52) U.S. Cl. ........................ 713/171; 380/255

(58) Field of Classification Search .............. None
See application file for complete search history.

(56) References Cited

U.S. PATENT DOCUMENTS

2001/0012361 A1* 8/2001 Kasahara ............... 380/30
2002/0116616 A1* 8/2002 Mi et al. ............... 713/168
2004/0076291 A1* 4/2004 Geiringer .............. 380/28
2005/0273592 A1* 12/2005 Pryor et al. ............ 713/150

OTHER PUBLICATIONS

Bruce Schneier, Applied Cryptography, Second Edition, Sec 1.3 and 19.3.*

* cited by examiner

*Primary Examiner*—Minh Dinh
*Assistant Examiner*—David Le
(74) *Attorney, Agent, or Firm*—Weingarten, Schurgin, Gagnebin & Lebovici LLP (57) ABSTRACT

A system and method for a web browser to convert an unencrypted character string into a cipher-text string combines a public-key encryption algorithm with a unique and constantly changing salt key. A private "server-key", a public "client-key" and a server session ID are generated by the server, and the client-key and the session ID are sent to the browser with the code used to encrypt the message. The session-based string can be a randomly generated set of characters which changes between established user sessions and the salt key can be formed from the server session ID string. The server contains the matching code necessary to decrypt the stream using the private key.

21 Claims, 5 Drawing Sheets

BCENCRYPTION (BCE)—A PUBLIC-KEY BASED METHOD TO ENCRYPT A DATA STREAM

CROSS REFERENCE TO RELATED APPLICATIONS

This application claims the benefit of provisional patent application No. 60/763,332, filed on Jan. 30, 2006.

BACKGROUND OF THE INVENTION

There are many applications, including electronic mail systems, bank systems and data processing systems, where the transferred information must pass over communications channels directly from a sender to an intended receiver without intermediate parties being able to interpret the transferred message. Authentication of the source of a message must often be ensured along with the verification and security of the message content.

In general, cryptographic systems are adapted to transfer a message between remote locations. Such systems include at least one encoding device at a first location and at least one decoding device at a second location, with the encoding and decoding devices all being coupled to a communication channel. For digital systems, the message can be defined to be a digital message, m, that is, a sequence of symbols from some alphabet. In practice, the alphabet is often chosen to be the binary alphabet consisting of the symbols 0 and 1.

Each encoding device is an apparatus which accepts two inputs: a message-to-be-encoded, m, and an encoding key or operator, E. Each encoding device transforms the message m in accordance with the encryption operator to produce an encoded version C of the message (which is denoted as the ciphertext) where c=E(m). The encoding key and the ciphertext can also be digital sequences.

Each decoding device is an apparatus which accepts two inputs: a ciphertext-to-be-decoded, c, and a decoding key or operator, D. Each decoding device transforms the ciphertext in accordance with the decryption operator to produce a decoded version m' of the ciphertext where m'=D(c), or m'=D(E(m)). Like the encoding key, the decoding key and decoded message m' are also typically digital sequences. The encoding and decoding keys are selected so that m'=m for all messages m.

Public-key encryption is an important aspect of securing communications across computer networks A well-known method of public-key encryption is RSA public-key encryption, disclosed by U.S. Pat. No. 4,405,829 to Rivest et al., herein incorporated by reference. The RSA cryptosystem, named after its inventors R. Rivest, A. Shamir, and L. Adleman, may be used to provide both secrecy and digital signatures and its security is based on the intractability of the integer factorization problem. In an RSA public-key cryptosystem, each user (e.g., user A) places in a public file an enciphering operator, or key, $E_A$ (see FIG. 1). User A keeps secret the details of the corresponding deciphering key $D_A$ which satisfies the equation $m=c^d \pmod{n}$ for any message m. In order for the public key system to be practical, both $E_A$ and $D_A$ must be efficiently computable. Furthermore, user A must not compromise $D_A$ when revealing $E_A$. That is, it should not be computationally feasible for an eavesdropper to find an efficient way of computing $D_A$, given only a specification of the enciphering key $E_A$. In a public key system, a judicious selection of keys ensures that only user A is able to compute $D_A$ efficiently.

Whenever another user (e.g., user B) wishes to send a message m to A, user B looks up $E_A$ in the public file and then sends the enciphered message $E_A(m)$ to user A. User A deciphers the message by computing $D_A(E_A(m))=m$. Since $D_A$ is not derivable from $E_A$ in a practical way, only user A can decipher the message $E_A(m)$ sent to him. If user A wants to send a response to user B, user A enciphers the message using user B's encryption key operator $E_B$, also available in the public file. Therefore no transactions between users A and B, such as exchange of secret keys, are required to initiate private communication. The only "setup" required is that each user who wishes to receive private communication must place his enciphering key operator E in the public file.

Additional methods have been used to increase protection of authentication communications. For instance, US Patent application 2005/0022020 (Fremberg) discloses using a hash algorithm (such as, for example, Secure Hash Algorithm 1 (SHA-1), which takes a message string of any length as input and produces a fixed length string as output) and further combining into an authentication request prior to computing the hash value at least an N-byte "nonce value" (random data only generated once by a random generator, used once, and then discarded), client and server IP addresses, and a client password. The Fremberg application discloses an embodiment in which a salt value is concatenated to the password before it is hashed.

In cryptography, a "salt" or "salt key" consists of random bits used as one of the inputs to a key derivation function. The other input is usually a password or passphrase. The output of the key derivation function is often stored as the encrypted version of the password. It can also be used as a key for use in a cipher or other cryptographic algorithm. A "salt" value is typically used in a hash function. The salt value may or may not be protected as a secret. In either case, the additional salt data makes it more difficult to conduct a dictionary attack using pre-encryption of dictionary entries, as each bit of salt used doubles the amount of storage and computation required. In some protocols, salt is transmitted in the clear with the encrypted data, sometimes along with the number of iterations used in generating the key. Cryptographic protocols that use salt include Secure Socket Layer (SSL) and Ciphersaber. Early Unix systems used a 12-bit salt, but modern implementations use more. Salt is very closely related to the concept of "nonce," or a number used only once per new user session for encryption and/or key-derivation functions

[see Wikipedia: "Salt (cryptography)"; Jan. 20, 2006; http://en.wikipedia.org/w/index.php?title=Salt_%28 cryptography%29&diff=10104303&oldid=9 507354].

Alternative secure-communications methods exist. Many companies and financial institutions desiring a secure web-based transaction currently use a server configured for Secure Socket Layer (SSL) communications. This SSL server approach is an industry standard, and a trusted method of securing data sent across the network. However, there are downsides to this approach such as:

Slower performance for each request due to the additional overhead of encrypting the entire transmission stream.

Additional hardware requirements to support the extra load on the server

More experienced system administration personnel to maintain the server

The potential additional costs to purchase an application container that supports SSL The need to purchase and renew SSL certificates for each server There are also other hardware components that attempt to reduce this cost and performance, that introduce an additional hardware layer into the network infrastructure to perform the SSL encoding. These hardware devices also suffer from their own negatives such as:

- More experienced system administration personnel to maintain the devices
- Some applications do not work with these devices in the network pathway
- Additional software modifications may be needed for each application to support these devices in the network pathway Existing software solutions for some of the above challenges have been developed in JavaScript for the browser, however, none of these solutions has utilized the RSA public-key approach. They all have used some form of home-grown and easily deciphered algorithm. Also, the nature of the HTTP protocol and HTML applications requires the code to encrypt also be sent to the client. This results in the equivalent of sending the keys to unlock the code to everyone listening (e.g., potential "middlemen" attackers). There have been various attempts to further obfuscate the code to prevent this, but anyone with minimal skills can convert this to readable text in seconds.

Therefore, there exist a need for improved methods to secure communications and information transfer over client-server computer networks. Particularly, there is need for alternative approaches to solve the above challenges and problems without the need for more experienced administrator skills, staying independent of a hardware solution, and not introducing any measurable performance impact on the server.

Accordingly, it is an object of this invention to provide a system and method for implementing a private communications system. It is another object to provide a system and method for establishing a private communications system for transmission of signed messages. It is still another object to provide a system and method for implementing a public key cryptographic communications system. It is a further object to provide a system and method for encoding and decoding digital data.

BRIEF SUMMARY OF THE INVENTION

The invention generally provides for an encryption system and method that uses a modified form of public key encryption algorithm to obfuscate data between two computing devices, such as, for example, a client browser, B, and an application server, A, wherein this encryption algorithm is modified to use a rolling salt key that is derived from a session-based string. In one embodiment, the salt key can be combined with a public key sent to the client to encrypt each character. The session-based string can be a randomly generated set of characters which changes between established user sessions. The public key can be generated on the server and sent to the client. This guarantees the encryption of each character is unique and only able to be unencrypted using a private key which is stored on the server. The server contains the matching code necessary to decrypt the stream using the private key.

One embodiment of the invention provides a communications security solution that utilizes an asymmetric algorithm or public-key approach combined with a unique, auto-generated, and constantly changing encryption operator. This encryption operator can be a combination of a public encryption exponent (public key), such as, for example, a prime number, and a salt key derived from a character of a session-based ID string, whereby the encryption operator is constantly changed by adding to the message m a succession of salt values derived from the sequential characters, or numeric representations of such characters, that comprise the session-based ID string. In alternative embodiments, the first salt value can be derived from the first character of the session-based ID string or, alternatively, it can be taken from a character other than the first character so long as the choice of starting point is communicated between the users, or between client and server.

An embodiment of the invention provides for a public-key encryption method that can be implemented in a World Wide Web or Internet browser owing to the increased security provided by a rolling salt key, and further provides for the rolling salt key to derive from a session-based ID string that is uniquely generated during each session, thus not requiring extra capability on the server or within the server application to generate and/or hold in memory an additional salt key string.

Embodiments of the invention further provide the advantage that the new algorithm according to the invention does not require the implementation of a full Secure Socket Layer (SSL) configuration on the server or use of the Secure Hyper-Text Transfer Protocol (HTTPS) for communication. Methods according to the invention can be used selectively on specific data streams to allow a more granular encryption of sensitive data only. This reduces the load on the server, and does not incur the performance overhead of an HTTPS/SSL based solution.

A further embodiment of the invention provides a method of encrypting a data stream, comprising the steps of: providing a web browser; providing an application server; providing a communication channel; providing a data stream (which data stream comprises an unencrypted text string of unencrypted text characters having numerical representations, $m_i$; providing a public client key, a modulus and a server session ID string, wherein at least the public client key and session ID string are generated by the server; and converting the unencrypted text string into a cipher-text string using a salt key, a public-key algorithm, the public client-key and the modulus, wherein the salt key is formed from the server session ID string. The method can include sending the public client key, the modulus and the session ID string across the communication channel to the browser together with an encryption code for encrypting each character of the unencrypted text string into at least one corresponding 3-digit cipher-text element, and can include using client-side JavaScript in the browser to implement encryption (and decryption, too, if the computational power of the browser is sufficient).

An embodiment can provide further for a private server key that is maintained on the on the server, for transmitting at least one cipher-text element from the browser to the server; and for decrypting the cipher-text element using the public-key algorithm, the private key, the modulus and the salt key. The public key algorithm can be the RSA public key algorithm and the modulus, n, private key, d, and salt key, s, can be used to recover at least one character m from at least cipher-text element, c, whereby $m'=c^d \mod n$ and $m=m'-s$. Within the step of converting the unencrypted text string into a cipher-text string, wherein the salt key is a number, s, representative of a character from the session ID added to the message m, the method according to one embodiment provides for creating an interim cipher-message element, m', whereby $m'=m+s$ and m' is then converted to a 3-digit cipher-text sequence. Two leading zeros can be padded to the cipher-text element (or sequence) when the cipher-text element is less than 10, and one leading zero can be padded when the cipher-text element is less than 100.

One embodiment further provides for a first salt key value that is a number representative of the first character of the session ID string. The first salt key value can be an ASCII decimal representation of any alphanumeric character of the session ID and the client and server can contract (or exchange information) to specify the starting location for the first salt key in the session ID sequence. Within the step of converting the unencrypted text string into a cipher-text string, a rolling salt key can be derived from the session ID string by taking a number representative of each successive alphanumeric character in the session ID string as a next salt value, $s_i$, for creating each successive interim message element $m'_i$, whereby $m'_i = m_i + s_i$. The step of providing a server session ID string can further comprise generating the session ID string as a randomly generated set of characters, which session ID string changes between established user sessions.

A further embodiment of the invention provides for the public client key to be generated on the server and sent to the client. The conversion on the client side of each character of the unencrypted text string into a cipher-text element is unique with respect to that cipher-text element and the cipher-text element is only able to be unencrypted using a private key, the private key being stored on the application server. The server also contains the matching code necessary to decrypt the stream using the private key. When converting the unencrypted text string of a target message and as each next unencrypted text character of a target message is encountered, each unencrypted text character can be converted to a next ASCII decimal number, $m'_i$, representing said character, and a next session ID alphanumeric character can be converted to its corresponding ASCII decimal value, which value is the next salt value, $s_i$. Each next unencrypted text character is then encrypted to a cipher-text sequence (or element), $c_i$, using the next salt value, whereby $m'_i = m_i + s_i$ and $c_i = (M'_i)^e$ mod n. The operation can store $c_i$ as a next element of a cipher-text string in memory and then the process iterates. During the creation of a next salt value, $s_i$, any non-alphanumeric characters embedded within the session ID string are preferably skipped. If the end of the session ID is reached prior to completing the target message, then the process can restart at the first session ID character in the session ID string. The cipher-string can be transmitted to the server when the end of the target message is reached.

A preferred embodiment of the invention provides a method for establishing cryptographic communications comprising the step of: encoding a digital message word signal M to a cipher-text word signal C, where M corresponds to a number representative of a message word or character and $0 < M < n-1$ where n is a composite number of the form $n = p \cdot q$ where p and q are prime numbers, and where C is a number representative of an encoded form of message word signal M, wherein said encoding step comprises the step of: transforming said message word signal M to an interim word signal M' by salting M with a number representative of one or more alphanumeric characters of a session ID string and then further transforming M' to said ciphertext word signal C whereby $C = (M')^e$ (mod n), where e is a number relatively prime to $(p-1) \cdot (q-1)$. The step of transforming the message word signal M to M' is an iterative process for a plurality of numbers representative of message characters $m_i$ that compose message word signal M whereby each number $m_i$ is transformed to a corresponding interim message number $m'_i$ by concatenation with a rolling salt key $s_i$ whereby $m'_i = m_i + s_i$. The method can include decoding said cipher-text word signal C to said message word signal M, wherein said decoding step comprises the step of: transforming said cipher-text word signal C, whereby: $m' = c^d$ (mod n) where d is a multiplicative inverse of $e \pmod{\text{lcm}((p-1), (q-1))}$; and $m_i = m'_i - s_i$; and message word signal M is recovered from the iterative generation of successive message characters $m_i$ concatenated to form message word signal M.

The encoding step can include the step of transforming M to C by the performance of a first ordered succession of invertible operations on M, wherein at least one step is transforming M to M' by concatenating M with a rolling salt key derived from the session-ID string; and further comprising the step of: decoding C to M by the performance of a second ordered succession of invertible operations on C, where each of the invertible operations of said second succession is the inverse of a corresponding one of said first succession, and wherein the order of said operations in said second succession is reversed with respect to the order of corresponding operations in said first succession.

In a preferred embodiment the session-ID string preferably has greater than 20 alphanumeric characters, although it can have as few as one. There is no upper limit to the session-ID string length. It is preferable that the numbers n, p, q, e and d are chosen to not overload the computational capability of the browser during the encryption (or decryption) step.

An embodiment of the invention provides also for a cryptographic communications system, comprising: a communications channel; an encoding means coupled to the channel and adapted for transforming a transmit message element m to a ciphertext element C and for transmitting C on the channel, where m corresponds to a number representative of a message character and $0 \leq m \leq (n-1)$, where n is a composite number of the form $n = p \cdot q$ where p and q are prime numbers, and where C corresponds to a number representative of an enciphered form of the message element and corresponds to $C = (m')^e$ (mod n) where e is a number relatively prime to the least common multiple of $(p-1, q-1)$ and where $m' = m + s$, s being a current salt value. The system also can include a decoding means coupled to the channel and adapted for receiving C from said channel and for transforming C to a receive message element M', where M' corresponds to a number representative of a deciphered form of C and corresponds to $M' \equiv C^d \pmod{n}$ where d is a multiplicative inverse of $e \pmod{\text{lcm}((p-1),(q-1))}$. The system can include a session ID unique to a communications session, the session ID having a sequence of at least one alphanumeric character, wherein S is an ASCII decimal representation of a character in the session ID string, and wherein, as each successive transmit message character is encountered, the next character in the session ID string is used to form the current salt value.

A further embodiment provides for a system further comprising: means for transmitting said cipher-text C from a first terminal to a second terminal, and wherein said second terminal includes means for decoding said cipher-text C to a message m, said second terminal including: means for transforming said cipher-text word signal C to said message word signal m', whereby $m' = c^d$ mod n and $m' = m + s$, wherein s is a salt value added to message m upon an earlier encryption step. As well, said encoding means can further comprise means for transforming said message character m to one or more interim ciphertext elements m', each message character m corresponding to a number representative of a portion of said interim cipher-text element in the range $0 < m < (n-1)$, and a means for transforming each of said interim cipher-text element m' to a cipher-text element (or sequence) c, c corresponding to a number representative of an encoded form of said interim cipher-text sequence or element m', whereby $c = (m')^e$ mod n.

A system according to one embodiment can further comprise means for transmitting said signed cipher-text element c or a plurality of such elements from said first terminal to said second terminal, wherein said second terminal includes means for decoding said signed cipher-text element or plurality of elements to said message character m, said second terminal including: means for transforming each of said signed cipher-text elements c to one of said interim cipher-text elements m', whereby $m'=(c)^d \bmod n$; and means for transforming said interim cipher-text elements m' to said message characters m, whereby m=m'−s. It is preferable that the numbers n, p, q, e and d are chosen to not overload the computational capability of the browser during the encryption (or decryption) computations.

DETAILED DESCRIPTION

U.S. provisional patent application No. 60/763,332, filed on Jan. 30, 2006 is incorporated by reference herein in its entirety.

A preferred embodiment of the invention utilizes an asymmetric algorithm or public-key approach combined with a unique, auto-generated, and constantly changing key to encrypt a data stream between an HTTP client and HTTP application container using a client-side/server-side coding pair.

The encryption system and method according to embodiments of the invention generally provide for a web browser, using client-side JavaScript, to convert a clear-text string into a cipher-text string based upon an RSA public-key algorithm using a unique and constantly changing encryption operator. A preferred embodiment uses a private decryption key ("server-key"), a public encryption key ("client-key") and a server session ID. The server-key and the client-key are both generated by the server, however, only the client-key and the session ID are sent across the communication channel to the browser along with the code used to encrypt. Using these components allows the code to convert each character of the clear-text string into a corresponding 3 digit numerical sequence.

A preferred embodiment further incorporates the public-key with using client-side JavaScript and a "rolling salt key". The nature of public-key encryption requires the use of a pair of keys (both public and private). One key is used to perform the encryption and a different key is used to perform the decryption of the target message. A public-key approach allows the ability to provide the public pieces to encrypt, yet does NOT provide the private key required to decrypt. This approach is the exact type of solution required for encrypting a data stream between an HTTP client and HTTP application container since the code to encrypt is required to be sent along. However, without the private decryption key ("server-key"), there is no easy way to decrypt the target message once encrypted. This is possible since the private decryption key (server-key) is never sent across the communication channel to the client. Only with this private decryption key (server-key) can one decrypt the target message.

Encrypting a message involves converting a clear-text string that is unencrypted into a converted string of numbers and/or characters encrypted with a cipher, such as, for example: the unencrypted letters "abc" being encrypted to (→) the encrypted numerical string "213423098".

Encrypting a character involves a conversion that is done for each character in the string using a changing key each time, known as the "salt key". This encryption salt value is used to translate a character from clear-text (unencrypted) to cipher-text (encrypted). The same salt key used to encrypt a character must be used to decrypt it. Changing the value of the salt key (or "rolling it") for each character allows the same character to be converted into different numeric sequences, therefore not repeating the same sequence. This approach is termed a "rolling salt key". This ability has the affect of decreasing the likelihood of a common pattern forming that could be exploited to break the code. For example, two conversions of the clear-text "abc" occurring at the same location in different sessions (or at different locations within a message of a single session) can be as follows:

Session 1: abc→213423098 (a=213, b=423, c=098)
Session 2: abc→523563221 (a=523, b=563, c=221)

A preferred embodiment provides for enhancing the ability to complicate the decryption by using a rolling salt key. This rolling salt key is a constantly changing value, in a random pattern. The algorithm can use the unique session ID automatically generated by the application container to provide the salt value. In one embodiment, the ASCII integer value of a first character of a clear-text message string is concatenated by the ASCII integer value of the first character of the session ID string (the latter being the salt value).

In an alternative embodiment, the first salt value used can be a character of the session ID string other than the first character. In this case the session ID string is treated in similar fashion to a ring counter, where the algorithm can start anywhere in the ring, so long as the starting point is known at both the encryption operation and the decryption step. Alternatively the client and server (or application) can contract at the beginning of the session for the starting position of the first salt character within the session ID string.

Second, third and successive salt values are derived from the subsequent characters following the first character used in the sequence of the session ID string. When the end of the session ID string is reached, then the first character of the session ID string is used again and the process iterates.

In a preferred embodiment according to the invention, the session ID string is a pseudo-randomly generated list of alphanumeric characters. Each application container itself generates this key for the express purpose of creating a unique number that is associated with the current user's session. It is temporarily stored in a session cookie in the browser's memory (not permanently on disk). Once the session is completed via logoff, or the browser is closed, this session cookie is permanently destroyed. Upon subsequent access to the same server, a different session ID will be generated for the same user. This sequence of characters is used by the application container to validate each request sent by the client to allow access to the private user data. Many secure web sites (banks, stock trading, etc.) utilize this type of session based management for their customers' transactions.

There exist multiple advantages to using the session ID or closely-related-parameter as the basis of the rolling salt key. The session ID will change for each session, and is never re-used between sessions. It is generated by each application server, and is an industry standard approach to transaction security used in mainstream application server platforms. This adds additional randomness to the algorithm to further reduce the ability to replicate numeric sequences, and expose patterns in the cipher-text. Also, by using a small enough set of keys, the method of at least one preferred embodiment can enable the browser (and its limited mathematical library) to perform this computation in a real-time manner with little to no performance impact. And, because the primes used can be small and only a single (or small number) of strings require post-processing, the server-side decryption component does not adversely affect the performance.

A preferred embodiment provides an algorithm for encrypting a data stream that is based upon the RSA public-key encryption. The embodiment can be understood further by use of more detailed examples.

EXAMPLE ONE

In a general example, key generation for RSA public-key encryption includes each entity creating an RSA public key and a corresponding private key. For example, referring to FIG. 2, each entity A (such as, for example, a server) can perform the following steps: generate two large random (and distinct) primes p and q, each roughly the same size; compute n=pq and $\phi=(p-1)(q-1)$; select a random integer e, $1<e<\phi$, such that gcd(e,$\phi$)=1, where gcd is the greatest common divisor function; and use the extended Euclidean algorithm to compute the unique integer d, wherein $1<d<\phi$, such that ed≡1 (mod $\phi$).

Figure 2:
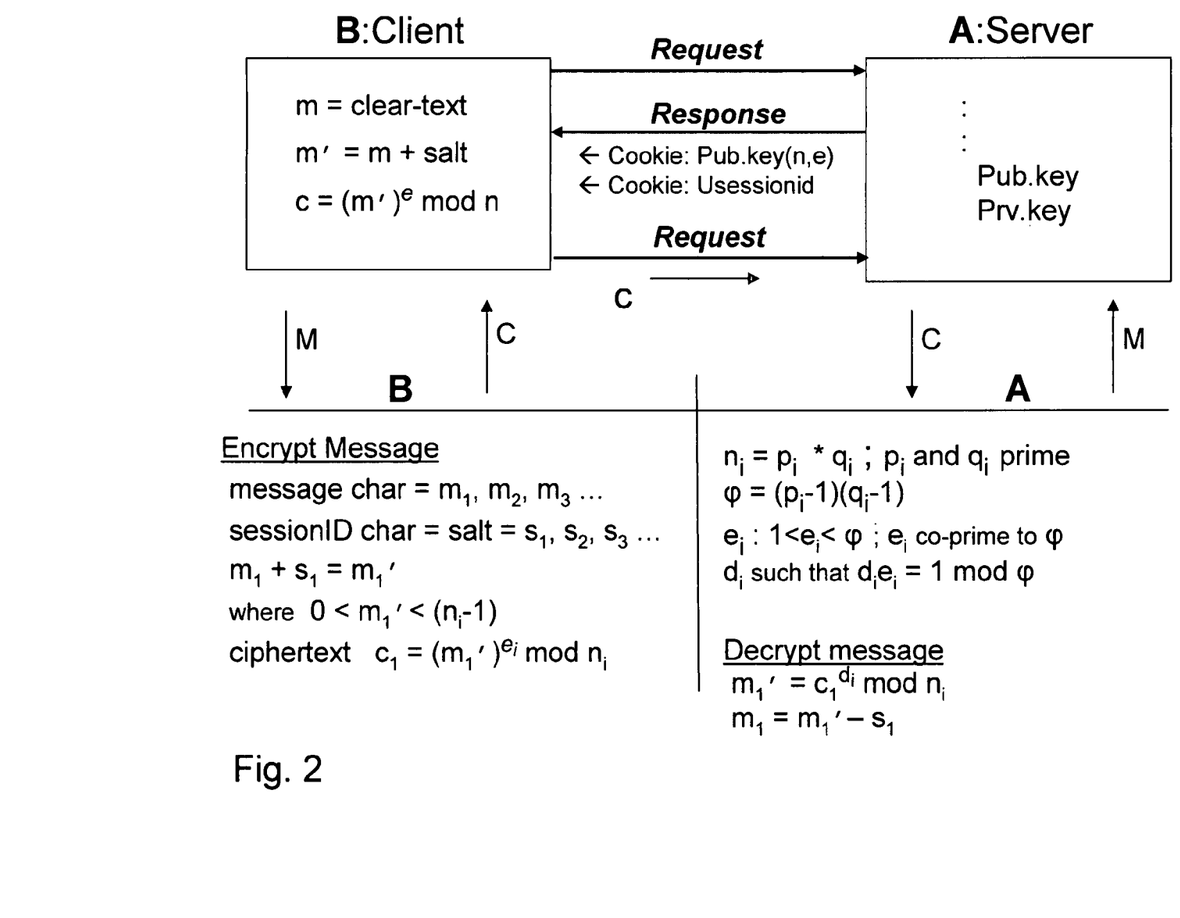
FIG. 2 illustrates an encryption method employing a rolling salt key based on a session ID, according to an embodiment of the invention.

Still referring to FIG. 2, A's public key is (n,e), while A's private key is d. The integers e and d in RSA key generation are called the encryption exponent and the decryption exponent, respectively, while n is called the modulus. User B (or client B) can encrypt a message m for entity A, which A subsequently can decrypt, by the following steps: obtain A's authentic public key (n,e); represent the message as an integer m in the interval $0<m<n-1$; utilize a first salt character s to concatenate m to create m', such that m'=m+s; compute $c=(m')^e$ (mod n); and send the ciphertext c to A. To recover (decrypt) plaintext m from c, A can use the private key d to recover m'=$c^d$ (mod n), and then plaintext m=m'-s. In FIG. 2, the numerical subscripts on m and s refer to first, second, third and additional message elements (such as, for example, characters).

The number $\lambda$=lcm(p-1;q-1), where lcm is the least common multiple operator, is sometimes called the universal exponent of n and may be used instead of $\phi=(p-1)(q-1)$ in RSA key generation. $\lambda$ is a proper divisor of $\phi$. Using $\lambda$ can result in a smaller decryption exponent d, which can result in faster decryption. However, if p and q are chosen at random, then gcd (p-1,q-1) is expected to be small, and consequently $\lambda$ and $\phi$ will be roughly of the same size.

The problem of computing the RSA decryption exponent d from the public key (n,e) and the problem of factoring n are computationally equivalent. When generating RSA keys, it is preferred that the primes p and q be selected in such a way that factoring n=p*q is computationally very difficult. However, embodiments preferably are characterized by choices of primes p and q that will not overload the computational capability of the browser during the encryption and decryption computational steps. In order to improve the efficiency of encryption, it is preferable to select a small encryption exponent e. However, small encryption exponents can weaken encryption security; therefore, salting the plaintext message can lessen the vulnerability to security attacks. Using a rolling salt value that is thrown away at the end of each session, assures that its even less vulnerable (see Chapter 8, Public-Key Encryption, in Handbook of Applied Cryptography, CRC Press, 1997; http://www.cacr.math.uwaterloo.ca/hac/about/chap8.pdf).

A preferred embodiment provides for the prime numbers p and q to be selected so that factoring n=p*q can computationally very difficult, so long as the values are chosen sufficiently to work within the browser, meaning that the computational load of the encryption and decryption should not adversely overload the computational capability of the browser. Primes p and q are preferably chosen in order to avoid the elliptic-curve factoring algorithm, by p and q being about the same bitlength, and sufficiently large. For example, if a 1024-bit modulus n is to be used, then each of p and q can preferably be about 512 bits in length, again as appropriately constrained by the computational capability of the browser. Also, the difference p−q is preferably not too small, lest p then be approximately equal to q and hence approximately equal to the square root of n. Weakened security follows, because n could be factored efficiently simply by trial division by all odd integers close to square root of n. If p and q are chosen at random, then it is more probable that p−q will be appropriately large.

EXAMPLE TWO

Figure 1:
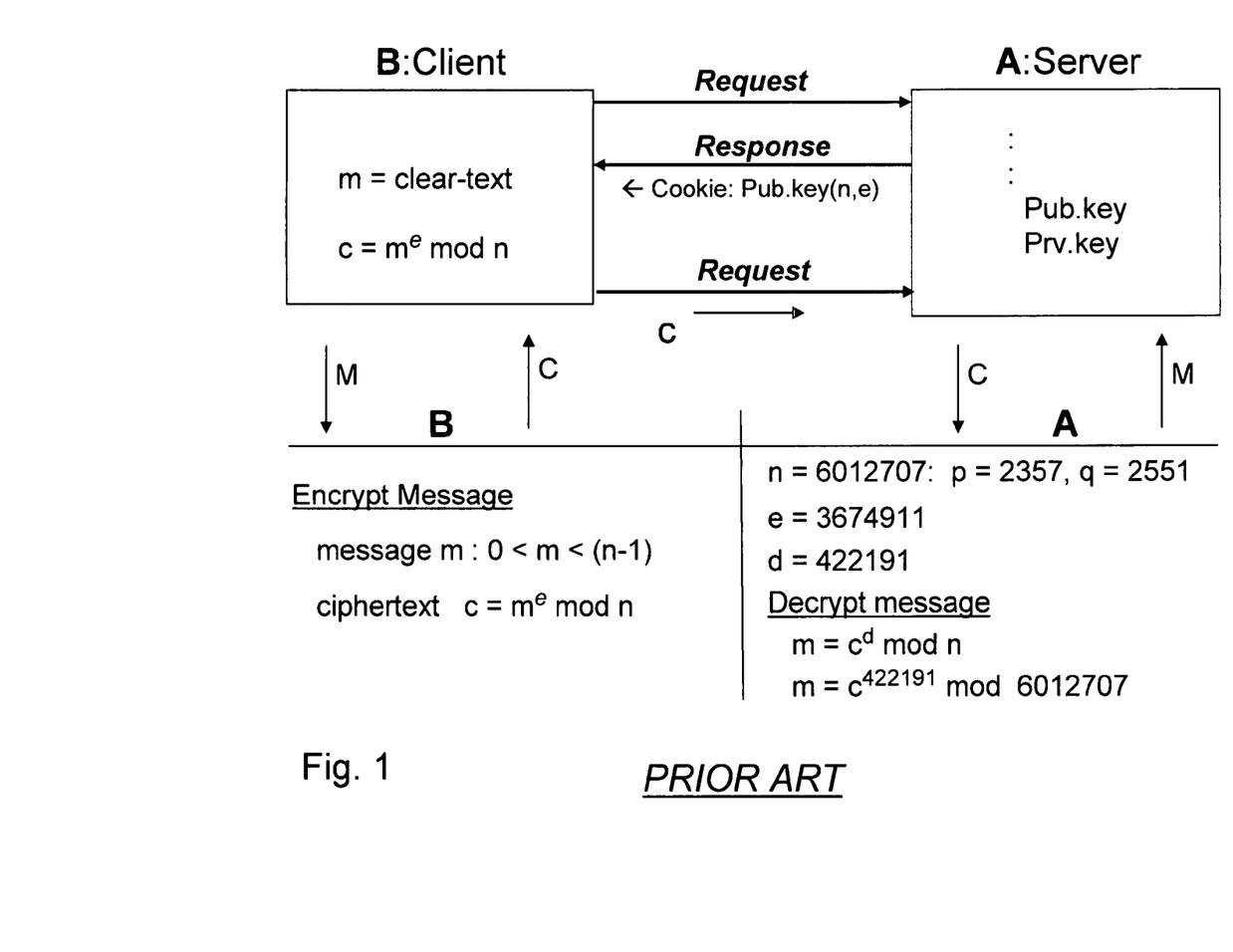
FIG. 1 illustrates an RSA public key/private key RSA authentication scheme according to the prior art.

To generate a key with the RSA encryption method according to a further embodiment, entity A can choose the primes p=2357, q=2551, such as illustrated in FIG. 1, and computes n=p*q=6012707 and $\phi=(p-1)(q-1)$=6007800. A chooses e=3674911 and, using the extended Euclidean algorithm, finds d=422191 such that ed≡1 (mod $\phi$). A's public key is the pair (n=6012707; e=3674911), while A's private key is d=422191. According to an embodiment of the invention a message character value is salted by concatenation with a character from the session ID string. If such concatenation were to yield the number 5234673 (i.e., m'=m+s=5234673), then to encrypt a salted message character, B uses an algorithm for modular exponentiation to compute the ciphertext $c=(m')^e$ (mod n)=$(5234673)^{3674911}$ mod 6012707=3650502, and sends this ciphertext to A. To decrypt the ciphertext c, A computes m'=$c^d$ (mod n)=$3650502^{422191}$ mod 6012707=5234673, which recovers m'.

EXAMPLE THREE

A sample session ID string can be "6C655A654B654432D5FF56." To use this session ID string as part of an encryption operator, if the salt character used (or its hexadecimal representation) is an even number, then the ASCII value of the salt s can be added to a first message value, m, to yield an interim, salted message value m', $$m'=m+s$$

where the ciphertext is then formed by $$c=(m')^e(\mathrm{mod}\ n)$$

Then, if c is less than 10 or less than 100, two leading zeros or one leading zero, respectively, can used to pad the value c for a consistent 3-character ciphertext value.

To decrypt the ciphertext, if the salt character used (or its hexadecimal representation) is an even number, then the decryption operation includes subtracting the salt value from the interim message value, m', that is regained from the decryption calculation $$m' = c^d \pmod{n}$$

in order to obtain the original message character, m, as follows $$m = m' - s$$

If the salt character used is an odd number, then, to encrypt, the ASCII value of the salt s can be subtracted from the first message value, m, to yield the interim, salted message value m', $$m' = m - s$$

and then, to decrypt, if the salt character used is an odd number, the decryption operation includes adding the salt value to the interim message value m' that was regained from the decryption calculation, so that $$m = m' + s.$$

Changing the operation between addition and subtraction depending on whether the salt value is odd or even adds another layer of security, which is important given that the primes used are low. And it helps to reduce the chance of generating replicated ciphertext strings, which further reduces the findable patterns in the entire ciphertext message.

As each character is encountered in the target string, the next character in the session ID is used as the current salt key. The character is encrypted using this value, and stored in memory as a cipher-string. As each character of the target message in turn is encountered, the next character in the session ID is used. If the end of the session ID is reached prior to completing the target message, the first character in the session ID is re-used. Any non-alphanumeric characters embedded within the session ID are skipped. The resulting cipher-text is appended to the growing cipher-string in preparation for transmission when the end of the target message is completed.

Using the example of a three letter message "abc," combined with the first three salt characters taken from the session ID string shown above (i.e., "6C6 . . . ") can yield the following result:

a:6=213, b:C=423, c:6=098→the resulting cipher-string is 213423098

In preferred embodiments, the session ID string will typically be in the range of 20-30 characters in length, although the session ID string can be any length. The session ID string must contain at least one alphanumeric character and has no upper limit. Preferably the session ID string is longer than 20 characters.

Figure 3:
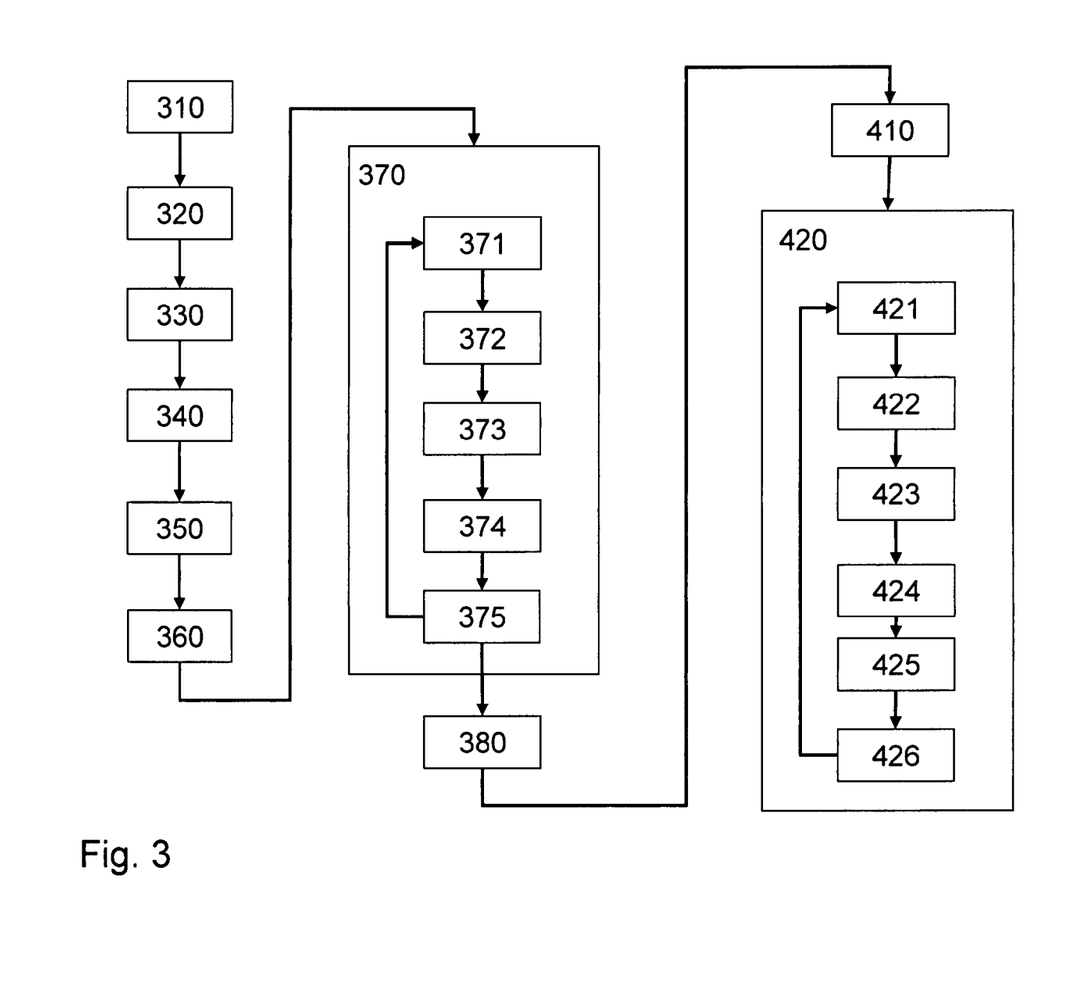
FIG. 3 is a flowchart illustrating steps for an encryption method employing a rolling salt key based on a session ID string, according to an embodiment of the invention.
Figure 4:
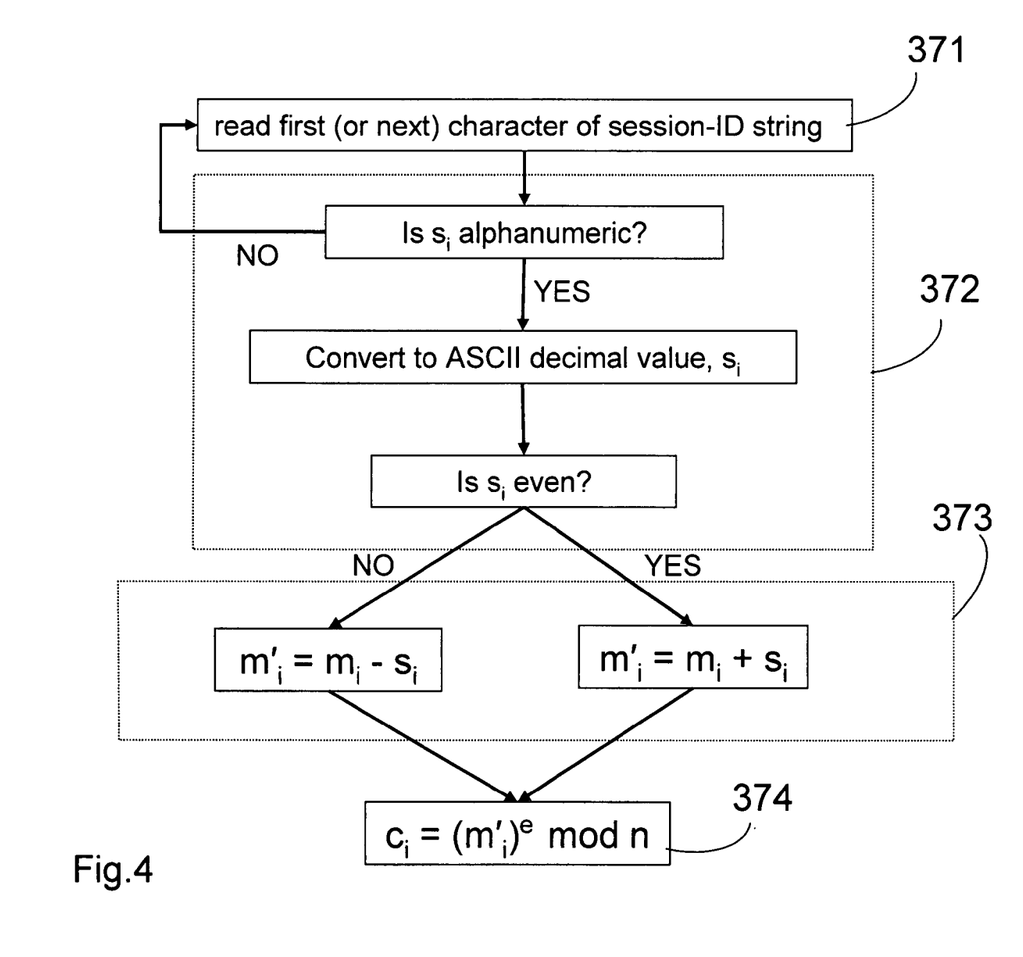
FIG. 4 is a flowchart illustrating details of steps whereby a salt key is created from a session ID string and used in an encryption step, according to an embodiment of the invention.

One embodiment of the invention provides for a method of encrypting a data stream that is illustrated in FIG. 3 and FIG. 4 to include at least the following steps: At step 310, a web (HTTP) browser with client-side JavaScript opens a communication channel and initiates contact with an HTTP application server; at step 320, the application server generates a random session ID string unique to session; at step 330, the server generates (or retrieves from its application settings) values for n, p and q, where n=p*q and p and q are prime numbers; at step 340, the server generates a public "client-key", e.g., an encryption exponent, e; at step 350, the server generates a private "server-key", e.g. decryption exponent d, which is kept secret on the server, the server having matching code necessary to decrypt the stream using d; at step 360, the server A sends {n,e}, session ID string and encryption operation code across the communication channel to the client B browser; at step 370, the client (browser) runs the encryption operation code with the encryption including at least the following sub-steps: at step 371, a first (or next) message character m is read from clear-text message string; at step 372, a first (or next) salt value, $s_i$, is created as a decimal value of a first (or next) alphanumeric session-ID character, which decimal value is tested for being even or odd; at step 373, the operation creates an interim, salted, message element (or interim cipher-message element), $m'_i$, whereby $m'_i = m_i + s_i$ if $s_i$ is even and whereby $m'_i = m_i - s_i$ if $s_i$ is odd; at step 374, $m'_i$ is converted to a corresponding 3-digit, numerical, cipher-text element (or sequence), $c_i$, whereby $c_i = (m'_i)^e \bmod n$; at step 375, the operation augments a cipher-text string with each additional cipher-text element that has been created and the routine iterates through the above steps 371-375 until the entire data stream or message string has been encrypted; and, at step 380, the client (browser) transmits the cipher-text string to the application server.

Figure 5:
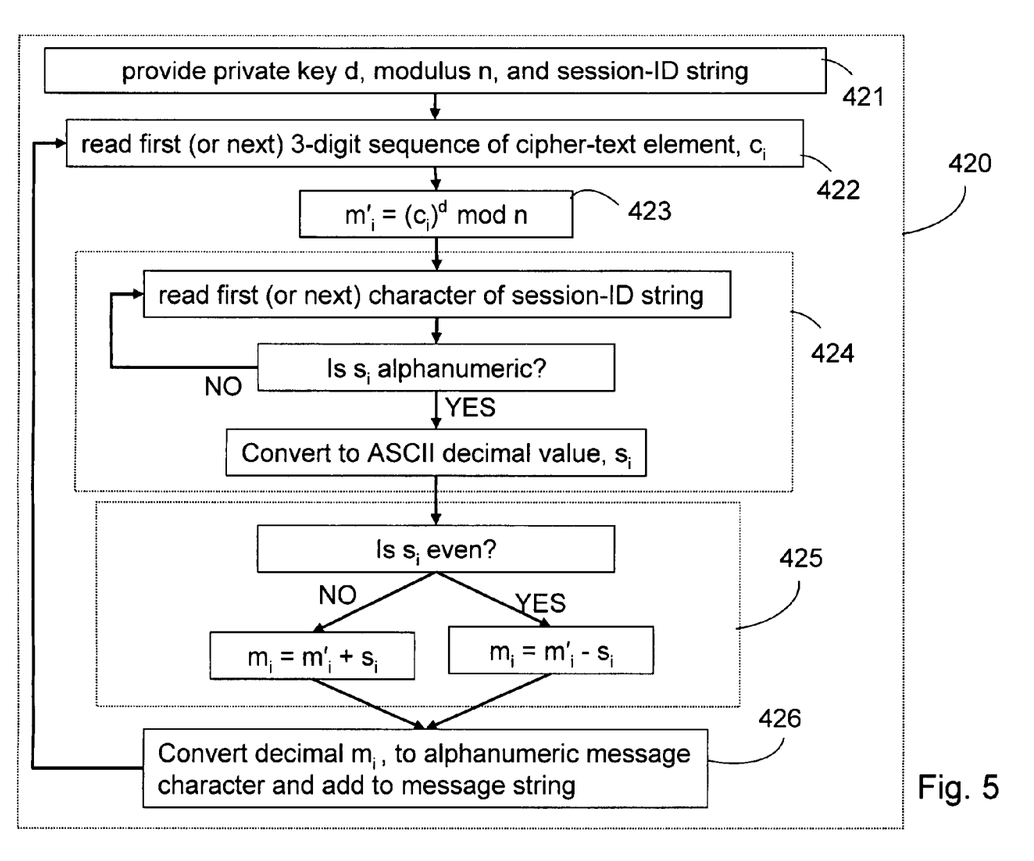
FIG. 5 is a flowchart illustrating details of steps whereby a salt key created from a session ID string is used in an unencryption step, according to an embodiment of the invention.

Referring now to FIG. 3 and FIG. 5, in a preferred embodiment the decryption can include the following steps: at step 410, the application server receives the cipher-text string and parses the string into at least a first cipher-text element, $c_i$; at step 420, the server runs the decryption operation code with at least the following sub-steps: at step 421, the server provides a private key, d, modulus, n, and a session ID string; at step 422, a first (or next) cipher-text character $c_i$ is read from the cipher-text string; at step 423, the decryption (or unencryption) operation converts $c_i$ to an interim, salted, message (or interim cipher-message, or interim message) element, $m'_i$, whereby $m'_i = (c_i)^d \bmod n$; at step 424, a first (or next) salt value, $s_i$, is created as a decimal value representative of a first (or next) alphanumeric session-ID character; which decimal value is tested for being even or odd; at step 425, the operation creates from the interim message element $m'_i$ a numerical representation, $m_i$, of each unencrypted (clear-text) message element, whereby $m'_i = m_i - s_i$ if $s_i$ even and whereby $m'_i = m_i + s_i$ if $s_i$ is odd; at step 426, the numerical representation is converted to each recovered, clear-text (alphanumeric) message element, which is added (written) to the recovered message string, and the operation iterates through the above sub-steps 422-426 for entire message string (or data stream).

Tables 1-7, below, list alphanumeric characters that have been tested and are found to be supported in the proper Word Foundation Class (WFC) configurations with respect to public-key infrastructure (PKI) usage. Therefore, preferred embodiments of the invention will preferably use these characters in session ID strings and/or the code that converts the session ID characters to ASCII decimals preferably is designed to convert these characters listed in Tables 1-7.

TABLE 1

| Standard US-ASCII 101 Keyboard Character Set |
|---|
| Lower Case: `1234567890-=\ |
| Upper Case: ~!@#$%^&*()_+\| |
| Lower Case: qwertyuiop[ ] |
| Upper Case: QWERTYUIOP{ } |
| Lower Case: asdfghjkl;' |
| Upper Case: ASDFGHJKL: |
| Lower Case: zxcvbnm,./ |
| Upper Case: ZXCVBNM<>? |
| (also the space character) |

TABLE 2

ISO-8859-2: (Czech OS machine)

ĄŁ¤ĽŚ§¨ŠŞŤŹ-ŽŻ° ą ł´ĺŚ˛ˇ šşťź˝žż
ŔÁÂĂÄĹĆÇČÉĘËÌÍÎÏĐŃŇÓÔ ÖÖ× ŘÙÚŰÜÝŢß
ŕáâăäĺćç čéęëìíîï đńňóôőö÷ řůúűüýţ

TABLE 3

Latin-1 Letters: English, French, Spanish Configurations

¿ÉßàçèéñÔ

TABLE 4

Other Latin-1 Letters

¿ÀÁÂÃÄÅÆ ÇÈÉÊË ÌÍÎÏÐÑÒ ÓÔÕÖ× ØÙÚÛÜÝÞ ßà

TABLE 5

Latin-2 Letters: Czech, Hungarian, Romanian Configurations

1A Î_ac ĆeÎu žŠ Ðd

TABLE 6

Latin-9 Letters: English, French, Spanish Configurations

¿ÄÉßà çèéôö

TABLE 7

Miscellaneous Characters

ALT-032 Tested OK: (SPACE character)
ALT-033 Tested OK: !
ALT-035 ... ALT-064 Tested OK: #$%&'( )*+,−./0123456789:;<=>?@

TABLE 7-continued

Miscellaneous Characters

ALT-065 ... ALT-126 Tested OK:
@ABCDEFGHIJKLMNOPQRSTUVWXYZ
[\] _'abcdefghijklmnopqrstuvwxyz{|}~
ALT-128 ... ALT-157 Tested OK:
ÇüéâäàåçêëèïîìÄÅÉæÆôöòûùÿÖÜ¢£¥
ALT-160 ... ALT-168 Tested OK: áíóúñÑªº¿
ALT-170 ... ALT-175 Tested OK: ¬½¼«»
ALT-225 Tested OK: \
ALT-230 Tested OK: μ
ALT-241 Tested OK: ±
ALT-246 Tested OK: ÷

Misc: ÐÑÒÓÔÕÖ× ØÙÚÛÜÝ L1

Tables 8-11, below, list characters that have been found to have known issues in Word Foundation Class programming with respect to public-key infrastructure (PKI) usage. Therefore, preferred embodiments of the invention will preferably not use these characters in session ID strings and/or the code that converts the session ID characters to ASCII decimals preferably is designed to skip the characters listed in Tables 8-11.

TABLE 8

ISO-8859-2 Letters: (Czech OS machine)

u.

TABLE 9

Latin-1 and Latin-9: English, French, Spanish Configurations

€

TABLE 10

Latin-2 Letters: Czech, Hungarian, Romanian Configurations

ężŠdÐ

TABLE 11

Miscellaneous characters that fail

ALT-001 ... ALT-031: (not viewable here)

ALT-034: "

ALT-127: ⌂

ALT-152: ÿ

ALT-158: P

ALT-159: f

ALT-169: ¬

ALT-176 ... ALT-224: ░▒▓│┤╡╢╖╕╣║╗╝╜╛┐└┴┬├─┼╞╟╚╔╩╦╠═╬╧╨╤╥╙╘╒╓╫╪┘┌█▄▌▐▀α
ALT-226 ... ALT-229: ΓπΣσ
ALT-231 ... ALT-240: τΦΘΩδ∞φε∩≡
ALT-242 ... ALT-245: ≥≤⌠⌡
ALT-247 ... ALT-255: ≈°∙·√ⁿ²■

While exemplary embodiments of the invention have been described, it should be understood that the present invention is not limited to the exemplary embodiments. The present invention is not limited to client-server configurations, to web browsers, to HTTP clients, to HTTP applications, to any particular configuration of public and private keys, or to any particular coding pairs, or to any particular way of encrypting a data stream. The present invention may be embodied in other specific forms without departing from the true scope of the invention. The described embodiments are to be considered in all respects only as illustrative and not restrictive.

What is claimed is:

1. A method of encrypting a data stream, comprising the steps of:
   providing a web browser running on a client;
   providing an application server;
   providing a communication channel between the client and the server;
   providing a data stream comprising an unencrypted text string m, which string is further comprised of unencrypted text characters having numerical representations, $m_i$;
   providing a public client key (n, e) and a server session ID string, wherein at least the public client key and session ID string are generated by the server; and
   converting the unencrypted text string m into a cipher-text string c using a salt key s, a public-key algorithm, and the public client-key, wherein the salt key s is formed from the server session ID string,
   wherein converting the unencrypted text string m into the cipher-text string c comprises:
      rolling the salt key s derived from the session ID string and determining a corresponding ASCII decimal value of a next successive alphanumeric character in the session ID string as a next salt value $s_i$;
      encrypting each next unencrypted text character $m_i$ to a corresponding cipher-text value $c_i=(m'_i)^e$ mod n where an interim cipher-message element $m'_i=m_i+s_i$, if $s_i$ is an even value and $m'_i=m_i-s_i$, if $s_i$ is an odd value;
      storing the cipher-text value $c_i$ as a next element of the cipher-text string c in memory;
      skipping, during the creation of the next salt value, $s_i$, any non-alphanumeric characters within the session ID string; and
      transmitting the cipher-text string c from memory when an end of the unencrypted text string m is reached.

2. The method of claim 1, further comprising: the server sending the public client key and the session ID string across the communication channel to the browser together with encryption programming code for encrypting the unencrypted text string m.

3. The method of claim 1 further comprising using client-side JavaScript in the browser to implement encryption.

4. The method of claim 2, further comprising:
   providing a private server key d;
   maintaining the private server key d on the server; and
   decrypting the cipher-text string c using a public-key algorithm, the private server key d and the salt key s.

5. The method of claim 4, wherein the public key algorithm is the RSA public key algorithm, and wherein decrypting the cipher-text string c into the unencrypted text string m comprises:
   decrypting each next encrypted cipher-text character $c_i$ to a corresponding interim text string element value $m'_i=(c_i)^d$ mod n;
   rolling the salt key s derived from the session ID string and determining a corresponding ASCII decimal value of a next successive alphanumeric character in the session ID string as a next salt value $s_i$;
   skipping, during the creation of the next salt value, $s_i$, any non-alphanumeric characters within the session ID string;
   determining the unencrypted text string element $m_i=m'_i+s_i$, if $s_i$ is an odd value, and $m_i=m'_i-s_i$, if $s_i$ is an even value; and
   storing the unencrypted message element $m_i$ as a next element of the unencrypted text string m in memory.

6. The method of claim 2, further comprising padding two leading zeros when the cipher-text element is less than 10 and one leading zero when the cipher-text element is less than 100.

7. The method of claim 1, wherein a first salt key $s_1$ is an ASCII decimal representation of any alphanumeric character of the session ID and the client and server contract or exchange information to specify a starting location for the first salt key in the session ID sequence.

8. The method of claim 1, wherein the step of providing a server session ID string further comprises generating the session ID string as a randomly generated set of characters, which session ID string changes between established user sessions.

9. The method of claim 1, wherein the public client key is generated on the server and sent to the client.

10. The method of claim 2, wherein the conversion of each character $m_i$ of the unencrypted text string m into a cipher-text element is unique with respect to that cipher-text element and the cipher-text element is only able to be unencrypted using a private server key, the private server key being stored on the application server.

11. The method of claim 10, wherein the server contains the matching code necessary to decrypt the stream using the private server key.

12. The method of claim 1 further comprising, when converting the unencrypted text string m of a target message into a cipher-text string:
   restarting at the first session ID character in the session ID string if the end of the session ID string is reached prior to completing the conversion of the target message.

13. The method of claim 1, wherein the session-ID string has greater than 20 alphanumeric characters.

14. A method of encryption, comprising:
   providing a client;
   providing, at the client, an unencrypted text string m, which string is further comprised of unencrypted text characters having numerical representations, $m_i$;
   receiving a public client key (n, e) and a server session ID string; and
   the client converting the unencrypted text string m into a cipher-text string c by:
      determining a corresponding ASCII decimal value of a next successive alphanumeric character in the session ID string as a next salt value $s_i$;
      encrypting each next unencrypted text character $m_i$ to a corresponding cipher-text value $c_i=(m'_i)^e$ mod n where an interim cipher-message element $m'_i=m_i+s_i$, if $s_i$ is an even value and $m'_i=m_i-s_i$, if $s_i$ is an odd value;
      storing the cipher-text value $c_i$ as a next element of the cipher-text string c in memory; and
      transmitting the cipher-text string c from memory when an end of the unencrypted text string m is reached.

15. The method of claim 14, further comprising:
establishing a communication channel between the client and a server.

16. The method of claim 15, further comprising:
the client receiving the public client key from the server over the communication channel.

17. The method of claim 14, further comprising:
the server generating and sending at least one of the public client key and the session ID string to the client over the communication channel.

18. The method of claim 14, further comprising:
skipping, during the creation of the next salt value, $s_i$, any non-alphanumeric character within the session ID string.

19. The method of claim 15, further comprising:
the server sending encryption programming code for the browser to execute to implement the conversion of the unencrypted text string m into a cipher-text string c.

20. The method of claim 19, wherein the programming code comprises client-side JavaScript code to implement encryption.

21. The method of claim 15, further comprising:
providing, at the server, a private server key d;
maintaining the private server key d on the server; and
the server decrypting the cipher-text string c into the unencrypted text string m using a public-key algorithm, the private server key d and the salt key s by:
  decrypting each next encrypted cipher-text character $c_i$ of the cipher-text string c to a corresponding interim text string element value $m'_i = (c_i)^d \bmod n$;
  rolling the salt key s derived from the session ID string and determining a corresponding ASCII decimal value of a next successive alphanumeric character in the session ID string as a next salt value $s_i$;
  skipping, during the creation of the next salt value, $s_i$, any non-alphanumeric characters within the session ID string;
  determining the unencrypted text string element $m_i = m'_i + s_i$, if $s_i$ is an odd value, and $m_i = m'_i - s_i$, if $s_i$ is an even value; and
  storing the unencrypted message element $m_i$ as a next element of the unencrypted text string m in memory.

* * * * *

UNITED STATES PATENT AND TRADEMARK OFFICE
CERTIFICATE OF CORRECTION

| | |
|---|---|
| PATENT NO. | : 7,865,730 B2 |
| APPLICATION NO. | : 11/698260 |
| DATED | : January 4, 2011 |
| INVENTOR(S) | : Brian K. Cortez |

Page 1 of 1

It is certified that error appears in the above-identified patent and that said Letters Patent is hereby corrected as shown below:

In the Specifications:

Column 14, Table 7, line 13, "ALT-225 Tested OK:\" should read --ALT-225 Tested OK:β--;

In the Claims:

Column 15, claim 5, lines 66-67, should read on the same line as follows:
--value $m'_1=(c_1)^d$--; and Column 16, claim 12, line 40, "string:" should read --string c:--.

Signed and Sealed this
Twenty-eighth Day of August, 2012

David J. Kappos
*Director of the United States Patent and Trademark Office*